(12) United States Patent
Chien et al.

(10) Patent No.: US 6,484,290 B1
(45) Date of Patent: Nov. 19, 2002

(54) IC PACKAGE SIMILAR IDE INTERFACE SOLID STATE DISK MODULE AND OPTIMIZED PIN DESIGN

(75) Inventors: Cheng-Chih Chien, Taichung (TW); Bing-Fei Wu, Hsinchu (TW); Khein-Seng Pua, Selangor D.E. (MY); Aw Yong-Chee Kong, Selangor D.E. (MY)

(73) Assignee: Feiya Technology Corp., Hsin-chu (TW)

( * ) Notice: Subject to any disclaimer, the term of this patent is extended or adjusted under 35 U.S.C. 154(b) by 0 days.

(21) Appl. No.: 09/433,010

(22) Filed: Nov. 3, 1999

(51) Int. Cl.[7] .............................................. G06F 17/50
(52) U.S. Cl. ...................... 716/1; 716/2; 716/3; 716/4
(58) Field of Search ........................ 716/1–18; 361/683, 361/724, 725, 726, 727, 684; 700/286, 206; 422/68.1

(56) References Cited

U.S. PATENT DOCUMENTS 5,784,291 A * 7/1998 Chen et al. .................... 716/10
5,838,589 A * 11/1998 Nail et al. ..................... 700/286
6,272,007 B1 * 8/2001 Kitlas et al. ................... 361/683

* cited by examiner

Primary Examiner—Matthew Smith
Assistant Examiner—Naum Levin
(74) Attorney, Agent, or Firm—Rabin & Berdo, P.C.

(57) ABSTRACT

The present invention involves an IC Package Similar IDE Interface Solid State Disk Module & Optimized Pin Design, in which the solid state disk module consists of a solid state disk module control, several flash memories, a power regulator; a low power detector and a short circuit preventing circuit; through link between signal position and data lines of the solid state disk and the IDE data storage a interface, data which are expected to be stored in the system is able to be written in the solid state disk module or read out by the solid state disk module; the link has a type of dual-in-line package which can be soldered directly on a PCB of the system so that the mechanical structure for conventional hard disk will be get rid of, resulting in high vibration resistance, small dimensions, therefore, it is very suitable to light type portable computer systems or industrial computer systems where requirements on data storage and vibration resistance are needed.

8 Claims, 5 Drawing Sheets

| | | | |
|---|---|---|---|
| HD8 | 1 | 32 | VCC |
| HD9 | 2 | 31 | HRST |
| HD10 | 3 | 30 | HD7 |
| HD11 | 4 | 29 | HD6 |
| HD12 | 5 | 28 | HD5 |
| HD13 | 6 | 27 | HD4 |
| HD14 | 7 | 26 | HD3 |
| HD15 | 8 | 25 | HD2 |
| IOW | 9 | 24 | HD1 |
| IOR | 10 | 23 | HD0 |
| CSEL | 11 | 22 | WAIT |
| IOIS16 | 12 | 21 | HIRQ |
| PDIAG | 13 | 20 | HA1 |
| HA2 | 14 | 19 | HA0 |
| CS2 | 15 | 18 | CS1 |
| GND | 16 | 17 | DASP |

FIG. 2

IC PACKAGE SIMILAR IDE INTERFACE SOLID STATE DISK MODULE AND OPTIMIZED PIN DESIGN

The present invention involves an IC package similar IDE interface solid state disk module and optimized pin design, especially, a data storage design which has a link for the IDE data storage interface and is suitable to various light type and portable computers and industrial computer systems where requirement on vibration resistance is needed.

Generally, a conventional hard disk stores data by means of the magnetic technique in which data storage or read is performed through a rotating magnetic head in high speed driven by a motor. The capacity of hard disk has been increased from dozens of MB (106) of earlier model to several GB (109), even to more than ten GB of modem model the access speed has increased from dozens of KB of earlier model to several MB of modem model, with the rapid development, the control becomes more precise, the rotating speed of motor becomes much higher, the running magnetic head is more sensitive to vibration. For portable or industrial computer systems it is hard to avoid vibration, therefore, if a conventional hard disk is used in such a system, its service life will shortened considerably, in addition, there will be risks to lose stored data in it.

In order to solve the problem on vibration, various mechanisms for vibration improvement were designed for weakening the effect to the hard disk, or an other system was designed to copy data which are expected to be stored to other hard disk in order to reduce the risks on damage of hard disk due to vibration, however, these measures could not avoid completely the risks to lose stored data due to vibration.

With development of the semiconductor technique, various electronic memories such as DRAM, SRAM and so on were developed, meanwhile, the capacity of a single memory increases, the cost reduces, and the operation speed is getting higher and higher, so, designers uses DRAM or SRAM plus a back up battery to substitute a hard disk in order to avoid data losing due to vibration; however, in such a design there is still a risk, e.g. when the main battery runs out and is not replaced with a new one in time, using power from the back up battery continuously will cause data losing, furthermore, such a design will result in higher cost and complexity of the system.

Coming out of a flash memory which is of a memory able to store data without use of electric power solves the problem on vibration for a conventional hard disk and the problem on back up battery necessary for DRAM or SRAM. Therefore, a new memory which is called solid state disk is emerged by substitution of the flash memory for DRAM or SRAM, such a solid state disk has a same size as that of a conventional hard disk, and is fixed on the framework by screws.

Development of computer products show the tendency to small size and light weight, so the size of such a solid state disk is sill too large, besides it is necessary to screwed on the framework, therefore, a memory element which has function of the solid state memory and dimensions of an IC package becomes more necessary.

And, at present, there are two type of memory interfaces, SCSI and IDE, the latter is more popular to use, almost more than 80% of computers adopt IDE interface, the IDE has 40 pins, in addition of power supply and master/stave mode selection, the total number of pins is about 44; according to the computer specifications, a computer system uses actually 29 pins, in addition of pins for supply and master/stave mode selection, has 32 pins used, therefore, less pins to be used may reduce the PCB area as well as the cost.

In order to overcome the shortcomings occurred in the conventional hard disk and the solid state disk using DRAM or SRAM plus a back up battery, the inventor develops an ingenious solid state disk module and optimized pin design which provides a novelist appearance for a memory element by his long term accumulated experience in that field, the optimized pin design makes users and designers to eliminate wormiest about vibration, power shortage and large dimensions so that it will be possible to offer various small, portable computers and industrial computer systems with a novelist apparatus which is able to solve the problem on the memory element that designers worried about.

According to the above mentioned, the present solid state disk module adopts a connection type of dual-in-line package which may be soldered directly on a PCB of the system and is different from the mechanical structure of a conventional hard disk, therefore, it features its high vibration resistance, small dimensions and no fastening parts, so it is very suitable to various small, portable computer systems or industrial computer systems where both data storage and vibration resistance are needed.

In order to describe in detail objects, characteristics and functions of the present invention, an example of embodiment of the present invention and figures are provided as follows.

FIG. 2 is a diagram of pin definitions of solid state disk module;

Figure 3:
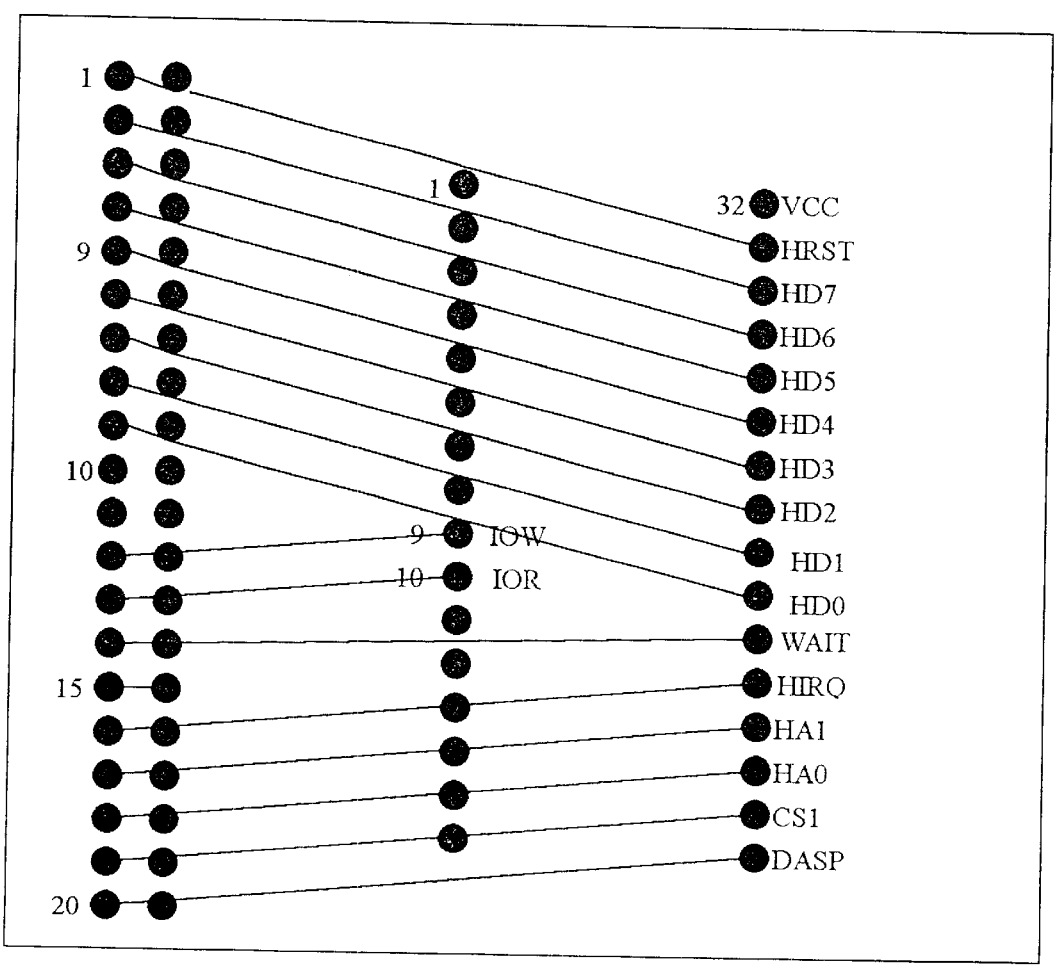
Figure 3:
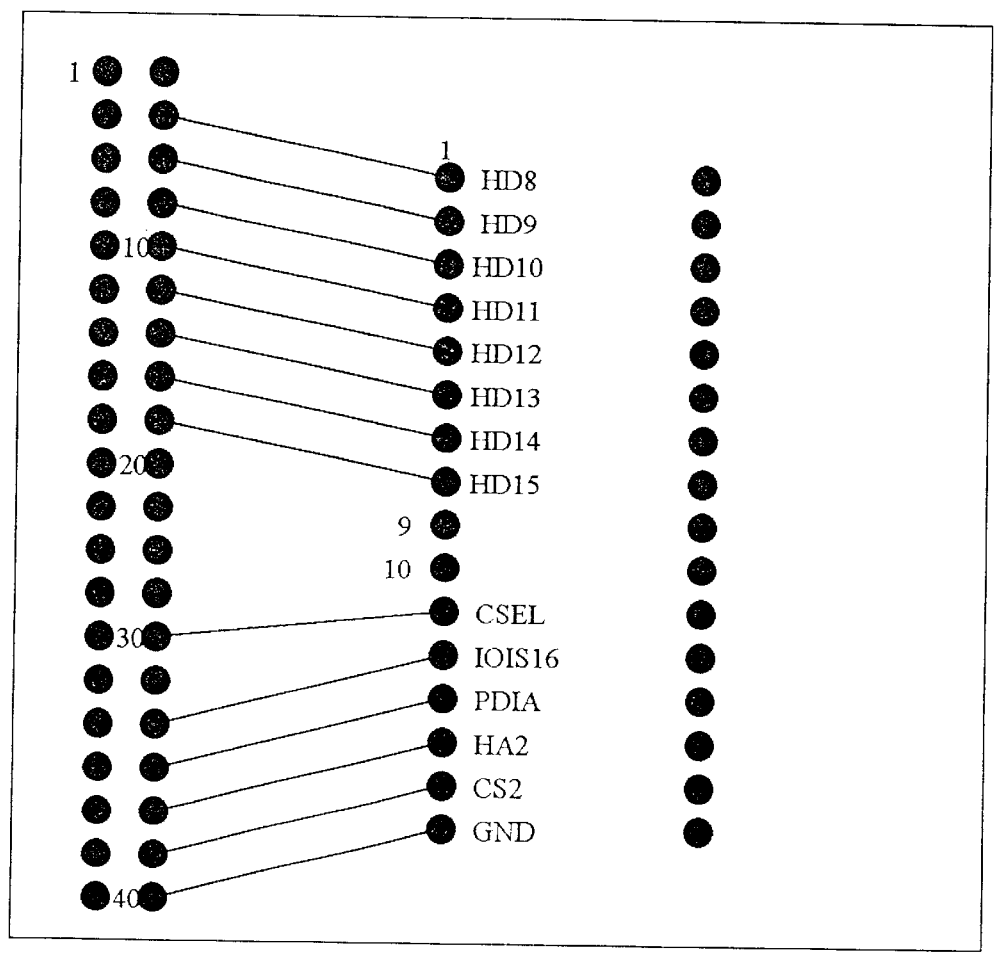
Figure 4:
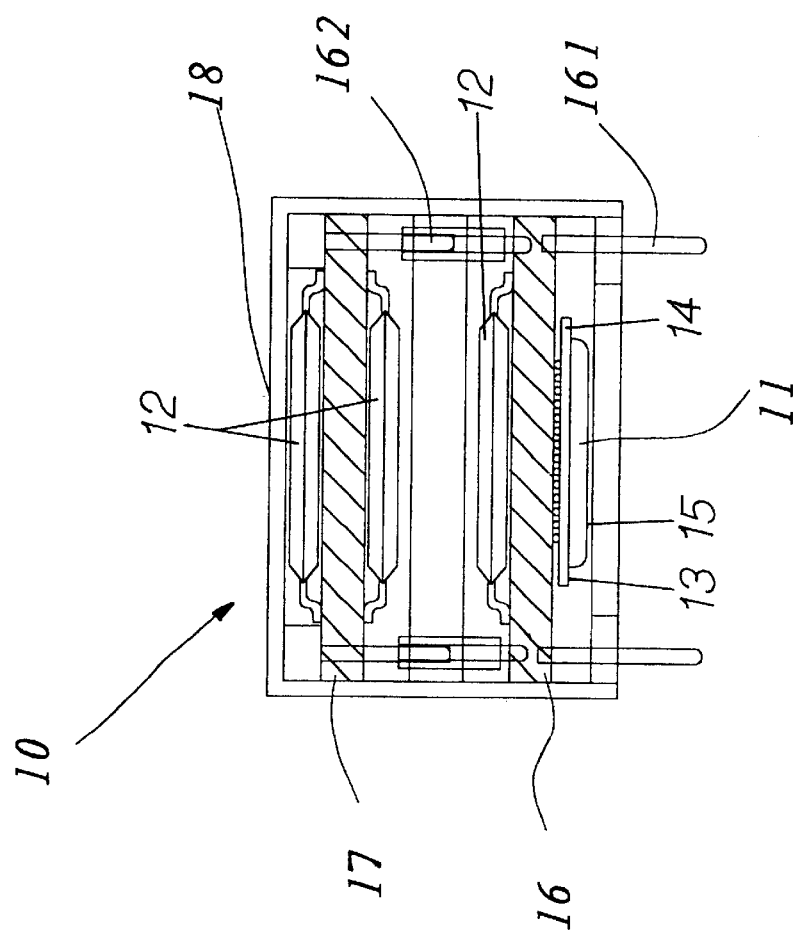

FIG. 3 A,B are schematic cross reference diagrams of pins, for solid state disk and IDE interface;

FIG. 4 is a schematic view of internal PCB set of solid state disk module;

Table 1 is a cross reference table of pin definitions for solid state disk and IDE interface.

Definitions of Item Numbers

Figure 1:
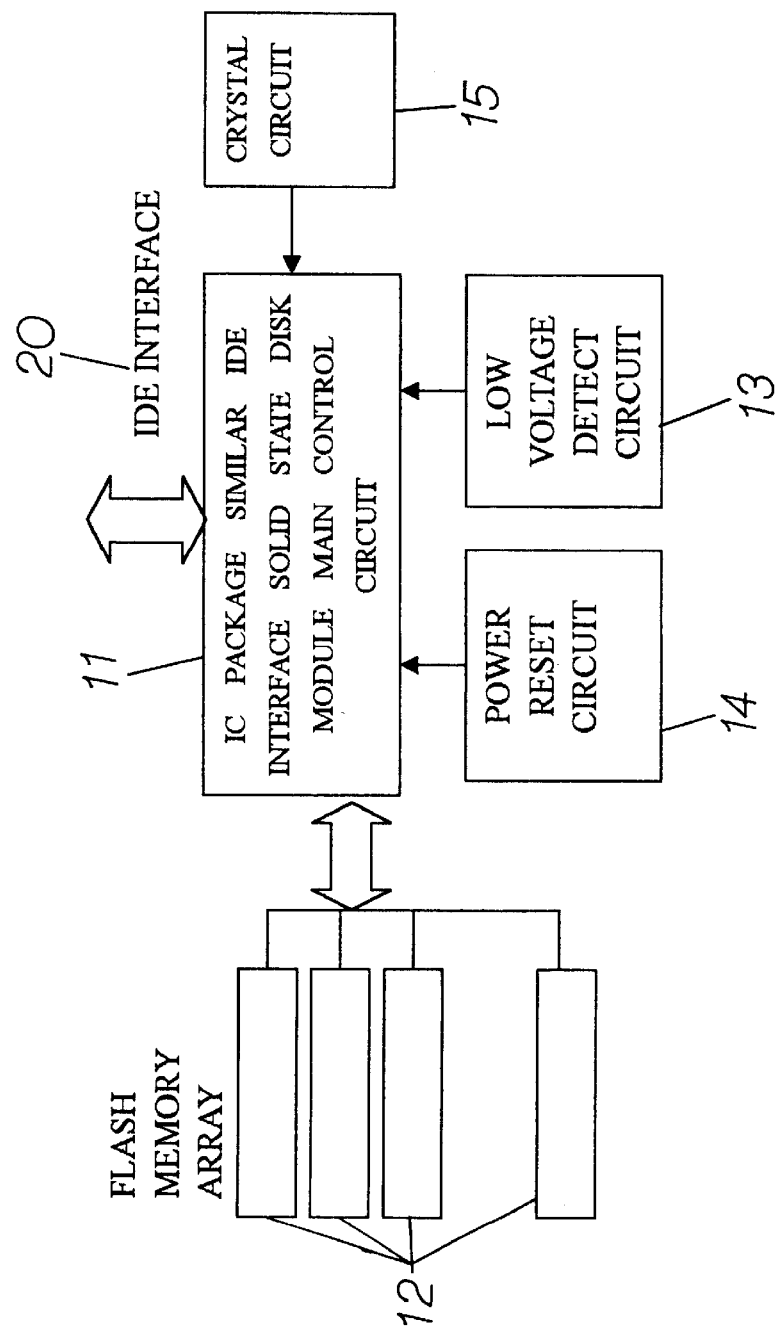
FIG. 1 is a block diagram of internal structure of solid state disk module.

10 Solid state disk module
11 Controller for solid state disk module
20 IDE interface
12 Flash memory
13 Low power detector
14 Power regulator
15 Oscillator crystal and circuit
16 Lower PCB
161 Pin plug
162 Pin socket
17 Upper PCB
18 Housing FIG. 1 is a block diagram of internal structure of the present invention, a solid state disk module 10 contains:

A controller for the solid state disk module 11 which is used to perform the interface communication protocol through the IDE interface 20 and data transmission) and data access through a flash memory array 12. There is a micro-controller (not shown in FIG. 1) to perform the calculating method of the flash memory 12.

A low power detector 13 which is used to reset the data in a temporary memory of the solid state disk module controller 11 and to initialize the parameters of the calculating method in the flash memory 12 when the system restart. It is also used to force the solid state disk controller 11 to enter a reset mode when a lower supplied power point than a preset value is detected in order to avoid mis-operation.

An oscillator crystal and circuit 15 which is used to generate digital pulses necessary for operation of the solid state disk controller 11. There are several flash memories 12.

FIG. 2 is a diagram of pin definitions of solid state disk module in which the definitions and layout of the pins are to provide a optimized pin definitions for the IDE interface and a data storage element that conforms to Standard JEDEC, the definitions of 32 pins for the solid state disk module 10 which correspond to 20 pins for the IDE interface are given in Table 1. When the solid state disk module 10 is to be used to substitute a conventional hard disk, in order to reduce the PCB complexity and the PCB layer to minimum, the PCB layout shows that distance for connection of pins defined for the solid state disk module 10 and 20 pins for the IDE interface 20 is shortest, in addition, there will be not any crossed wiring.

The left hand diagram in FIG. 3 shows a diagram of definitions of 40 pins for the IDE interface, the top left pin is the first pin; the right hand diagram shows a diagram of definitions of pins for the solid state disk module, the top left pin is also the first pin. Each pairs of points linked by straight lines mean the two linked pins have a same function, now, when the solid state disk module is to be used to replace a conventional hard disk, it is necessary to remove the 40 pins for the IDE interface 20, then, place the solid state disk module on, it will be found that the pin layout on the PCB may be used directly for the solid state disk module 10 without modification, meanwhile, there will be not any crossed wiring, at the same time, FIG. 3 (B) shows also that there is no crossing between wiring, and the wiring is shortest.

FIG. 4 is a schematic view of internal PCB set of solid state disk module; the present embodiment takes a two PCB set for example, the layer of PCB to be used depends to the capacity of the solid state disk module to be needed, it will not be limited to two PCBs.

In the solid state disk module 10 a lower PCB 16 and an upper PCB 17 (containing 2–6 conductive layers) are provided, on the lower PCB 16 the solid state disk module controller 11, several flash memories 12, the power regulator 14, the low power detector 13 and the oscillator crystal and circuit 15 are soldered, on its bottom side, there are 32 pin plugs 161 soldered on the outside of the solid state disk module 10 for linking other apparatus in the system (e.g. mainframe PCB etc.), on the top side there are pin sockets 162 provided correspondingly for connecting with the upper PCB 17 to form a PCB set. On the upper PCB 17 only flash memories 12 are soldered in order to expand the capacity of the solid state disk module 10, in such a way that the capacity can be expanded by increasing the height of the PCB set without the area changing. If the flash memories 12 which are soldered on the PCB 16 have a capacity enough to use, the PCB 17 may not be used. Besides, a housing 18 is provided to contain the solid state disk module 10 and to protect it from RF interference.

Therefore, the IC package similar IDE interface solid state disk and optimized pin design of the present invention which is able to make the solid state disk module to be connected with the IDE interface so that it will solve the problems on memory element damage and data losing due to vibration or battery replacement, so it is very suitable to various small, portable computers and industrial computer system where a data memory element with vibration resistance is needed, and has really the practical applicability, novelty and utilizable value in industries that conform to the regulations specified in the Patent Law.

The embodiment mentioned above is only a better example to embody the present invention, and can not restrict the range of embodiment of the present invention to it. Any modification or change made based on the claims of the present invention shall be considered to be within coverage of the present invention.

TABLE 1

| SSD Pin | IDE 40 Pins | Pin Code | Definition |
| --- | --- | --- | --- |
| 1 | 4 | HD8 | Data Bus 8 |
| 2 | 6 | HD9 | Data Bus 9 |
| 3 | 8 | HD10 | Data Bus 10 |
| 4 | 10 | HD11 | Data Bus 11 |
| 5 | 12 | HD12 | Data Bus 12 |
| 6 | 14 | HD13 | Data Bus 13 |
| 7 | 16 | HD14 | Data Bus 14 |
| 8 | 18 | HD15 | Data Bus 15 |
| 9 | 23 | IOW | Host write strobe |
| 10 | 25 | IOR | Host read strobe |
| 11 | 28 | CSEL | (Master/Slave)select |
| 12 | 32 | IOIS16 | Data transfer with 16 bits or 8 bits |
| 13 | 34 | PDIAG | Pass Diagnostic |
| 14 | 36 | HA2 | Address Bus 2 |
| 15 | 38 | CS2 | Chip select 2 |
| 16 | 40 | GND | Ground |
| 17 | 39 | DASP | Drive active or slave present |
| 18 | 37 | CS1 | Chip select 1 |
| 19 | 35 | HA0 | Address Bus 0 |
| 20 | 33 | HA1 | Address Bus 1 |
| 21 | 31 | HIRQ | Interrupt Request |
| 22 | 27 | WAIT | Waiting signal |
| 23 | 17 | HD0 | Data Bus 0 |
| 24 | 15 | HD1 | Data Bus 1 |
| 25 | 13 | HD2 | Data Bus 2 |
| 26 | 11 | HD3 | Data Bus 3 |
| 27 | 9 | HD4 | Data Bus 4 |
| 28 | 7 | HD5 | Data Bus 5 |
| 29 | 5 | HD6 | Data Bus 6 |
| 30 | 3 | HD7 | Data Bus 7 |
| 31 | 1 | HRST | Host Reset |
| 32 | NC | VCC | Power |

What is claimed is:

1. An IC package similar IDE interface solid state disk module, comprising:
    a standard IDE interface with a dual-in-line configuration;
    a flash memory array for data storage, including at least one flash memory; and
    a solid state disk module controller that performs an interface communication protocol to receive and transmit data through the IDE interface, and controls the storage of, and access to, the data in the flash memory array;
    wherein the solid state disk module controller includes a micro-controller to perform the calculating method of the flash memory array.

2. An IC package similar IDE interface solid state disk module according to claim 1, further comprising:
    a low power detector that resets the data in a temporary memory of the solid state disk module controller and initializes parameters of a calculating method in the flash memory array when a system to which the solid state disk module is connected restarts.

3. An IC package similar IDE interface solid state disk module according to claim 1, further comprising:
    an oscillator crystal and circuit that generates digital pulses necessary for operation of the solid state disk module controller.

4. An IC package similar IDE interface solid state disk module according to claim 1, further comprising:
    at least one PCB, a first of the at least one PCB having one side on which there are elements of the solid state disk module soldered, a bottom side on which there is a plurality of pin plugs provided that extend outside of the solid state disk module for connecting with other apparatus in the system, and a top side on which there are pin sockets provided correspondingly for connecting with a second of the at least one PCB to form a PCB set.

5. An IC package similar IDE interface solid state disk module according to claim 1, further comprising:

a housing that contains the solid state disk module and protects it from RF interference.

6. An IC package similar IDE interface solid state disk module according to claim 4, wherein the at least one PCB have substrates made from an organic material on which 2–6 conductive layers are provided.

7. An IDE interface solid state disk module according to claim 4, wherein the pin plugs on the bottom of the first of the at least one PCB are arranged in a dual in-line configuration in such order that they can be connected to the corresponding pins of the IDE interface with shortest wiring and without crossed wiring on an interconnecting PCB.

8. An IDE interface solid state disk module according to claim 4, wherein the number of pin plugs on the bottom of the first of the least one PCB is 32.

* * * * *